United States Patent Office 3,207,446
Patented Sept. 21, 1965

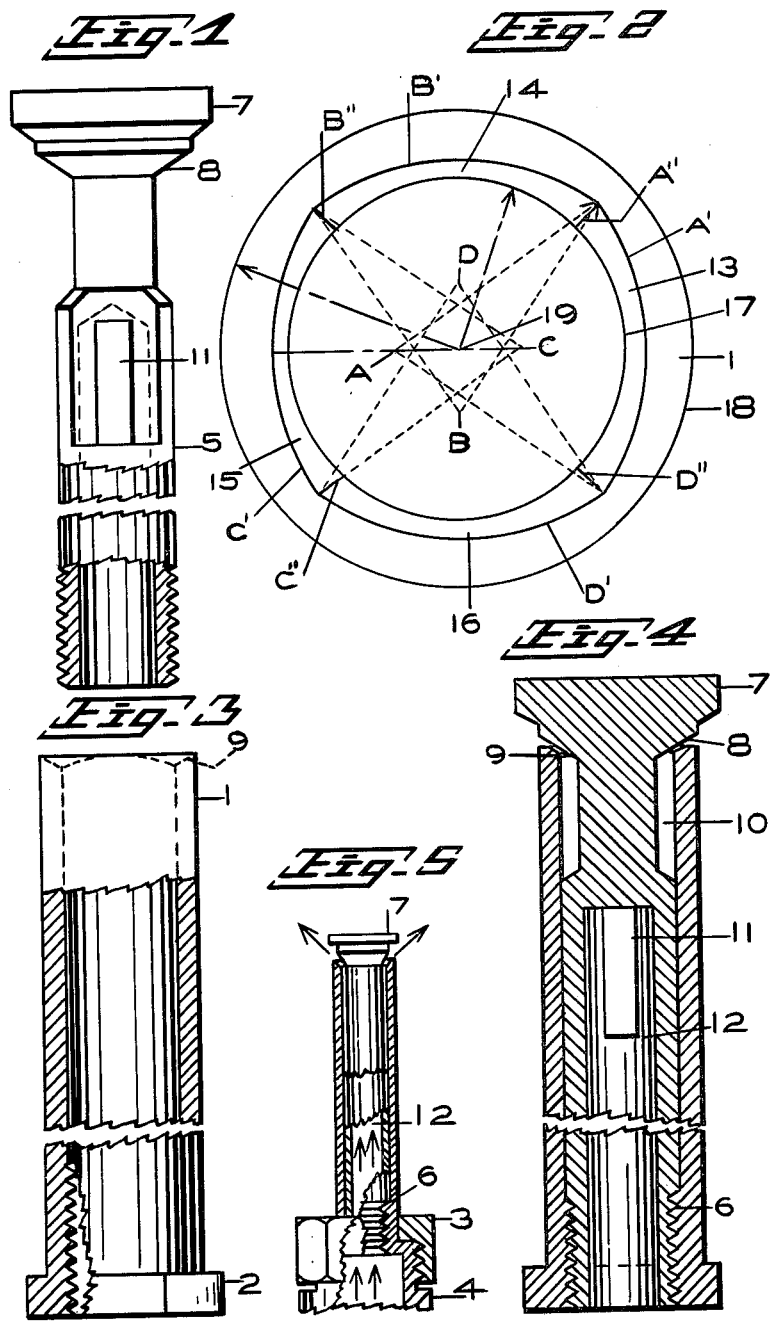

3,207,446
SPRINKLER HEAD FOR WATER SPRINKLING SYSTEMS
Gerhard Jacob Dyck, 1306 13th St. E., Saskatoon, Saskatchewan, Canada
Filed July 25, 1963, Ser. No. 297,562
4 Claims. (Cl. 239—515)

This invention relates to sprinkler heads, having particular reference to a pattern controlled head for use on underground pipes of a permanent lawn sprinkling system.

In the art to which the invention relates, in lawn sprinkling, more particularly from underground pipe systems, spray heads forming circular spray patterns are more usually employed, the use of such heads resulting in considerable overlapping in the sprinkler spray patterns.

The present invention is concerned with a sprinkler head for use primarily with lawn watering systems of the above character, and including an improved valve assembly for the head by which angular spray patterns may be obtained, having particular reference to triangular and rectangular patterns, and by which the sprinkler heads may be so placed as to avoid overlapping with resulting water saving in lawn sprinkling.

Other features and advantages of the invention will become apparent by reference to the accompanying description taken in conjunction with the drawings.

In the drawings, wherein is illustrated a preferred embodiment of the invention, FIG. 1 is an enlarged side view of the valve stem of the sprinkler head, shown in part broken away and partly in section.

FIG. 2 is an enlarged, somewhat diagrammatic, top plan view of the upper end of the valve casing.

FIG. 3 is an enlarged side view of the valve casing, shown partly sectioned and broken away.

FIG. 4 is an enlarged side view of the valve casing and valve stem assembled, shown vertically sectioned and in part broken away.

FIG. 5 is a side view, partly in section and in part broken away, of the sprinkler head coupled on an outlet pipe end of a lawn sprinkler system.

Having reference to the drawings, the sprinkler head includes a cylindrical valve casing 1 with annular shoulder 2 at its lower end by which it may be attached by a coupling 3 threaded on an outlet end 4 of an upright sprinkler pipe terminus in a lawn sprinkling system.

Within the casing 1 is mounted a valve stem 5 threaded at 6 in the casing 1 to be vertically adjustable therein. The valve stem includes a head 7 with inward downwardly tapered lower portion 8 in parallel relation to the upper end 9 of the valve casing.

The upper portion of the valve stem 5 is cut away below the head 7, starting at the lower end of the tapered portion 8 of the head, to provide an annular outlet passage 10 for the water, this outlet passage having communication through slots 11 with a bore 12 formed in the lower part of the valve stem and extending to the lower end of the valve stem to provide an outlet passage for the water from the sprinkler system pipe end 4, the water passing through the bore 12, slots 11 and annular outlet passage 10 to discharge through the upper end of the casing 1. Such discharge is regulated by the threaded mounting of the valve stem 5 in the casing 1 to vary the outlet spacing between the tapered portion 8 of the valve stem head 7 and the upper end 9 of the valve casing 1.

To provide the pattern for the water spray the upper end 9 of the valve casing is formed as shown in FIGURE 2, with three or more concavely curved sections, four such sections being provided in the present showing, numbered 13, 14, 15, and 16. The inner edge of the valve casing defining the end of the bore is indicated by the line 17 and the outer edge by the line 18. The upper end 9 of the valve casing forms a seat in parallel opposing relation to the tapered portion 8 of the valve stem head.

Each of the sections 13, 14, 15 and 16 corresponds on its upper surface to the inner face of a quarter segment of a cone, the segment being derived from a transverse slice through the cone and the cone having its apex respectively for each section at A, B, C and D, and the base lines for the sections being respectively indicated at A', B', C' and D'. The divisions between the curved conical sections are indicated by the lines A'', B'', C'' and D'', it being noted that this represents the greatest diameter of the valve seat.

The conical sections 13, 14, 15 and 16 have the apex of the cone from which they are formed offset relative to the axis of the valve casing 5, this axis being indicated by the numeral 19. The amount of this offset will determine the spray pattern area to be covered, the greater the offset the greater the controlled area, and each intersection of the conical surface, as denoted by the lines A'', B'', C'' and D'', is the part from which the water will be sprayed the farthest, that is these will form the points of the spray pattern.

The number of surface sections may vary to provide different spray patterns, as for example three such sections would provide a triangular spray pattern, four sections, as in the present showing, a quadrilateral pattern and five sections a pentagonal pattern. Also it is to be understood that while the present showing it limited to a lawn spraying system, the device is also adaptable for use in an overhead sprinkling system and for like purposes. In the use of the device, valve casings with different seat sections could be interchangeable with a common valve stem. The flow of water would be regulated by the space between the valve seat at 9 and the tapered portion 8 of the valve head. The spray pattern used, whether triangular or rectangular shaped, would be determined by the shape of the area to be covered to avoid overlapping of the spray patterns, with resultant saving in the water used and a complete uniform coverage of the area to be sprayed.

I claim:

1. A sprinkler for attachment on a pipe end forming a terminus of a sprinkler system, including a cylindrical valve casing attachable on the pipe end and a valve stem threaded in the bore of the valve casing, said stem having a head overlying the upper end of the valve casing, said head having an annular inwardly downward tapered under side in opposing relation to the upper end of the valve casing, in which the face of the upper end of the valve casing is formed with three or more sections concavely curved on their upper sides, the concave portions of which correspond to the inner faces of sections of a transverse slice of a cone.

2. A sprinkler as set out in claim 1 in which the bases of the conical sections are outward and the apices of conical segments formed by the ends of said sections inwardly produced are offset relative to the axis of the casing, the distance from the apices of said sections produced to the inside wall of the casing being greater than the radius of the casing bore.

3. A sprinkler as set out in claim 1 in which the conical sections are formed on the annular inner portion of the upper end of the valve casing inclined downward corresponding to the downward inward taper of the under side of the valve stem head.

4. In a sprinkler attachable on a pipe end of a water sprinkling system, said sprinkler including a cylindrical valve casing and a valve stem threaded in the casing, said stem having a head overlying the upper end of the valve casing; an improved valve casing by which the spray from the sprinkler may be constrained to patterns, said casing having concavely curved sections formed on the upper end thereof in opposing relation to the under side of the valve stem head, said sections corresponding to segments of the inner face of a transverse slice of a cone, and in which the ends of the sections inwardly produced have their apices offset relative to the axis of the casing oppositely relative to the base portions of the sections, and the conical sections are formed on the inner annular portion of the upper end of the valve casing.

References Cited by the Examiner

UNITED STATES PATENTS

| | | | |
|---|---|---|---|
| 1,881,409 | 10/32 | Le Moon. | |
| 1,931,761 | 10/33 | Hertel | 239—541 |
| 1,978,721 | 10/34 | Perkins. | |
| 2,128,552 | 8/38 | Rader et al. | |
| 2,212,533 | 8/40 | Zimmerman. | |
| 2,546,574 | 3/51 | Wilcox | 239—581 |
| 2,935,266 | 5/60 | Coleondro et al. | 239—581 |
| 2,943,798 | 7/60 | Rienks | 239—601 |
| 3,029,030 | 4/62 | Dey. | |
| 3,045,926 | 7/62 | Steinen | 239—601 |

EVERETT W. KIRBY, *Primary Examiner.*